United States Patent
Chauvet et al.

(10) Patent No.: US 9,575,803 B2
(45) Date of Patent: Feb. 21, 2017

(54) DETERMINING AN ORDERING TO USE TO OPEN AND CLOSE PROGRAMS THAT CALL OTHER PROGRAMS

(71) Applicant: INTERNATIONAL BUSINESS MACHINES CORPORATION, Armonk, NY (US)

(72) Inventors: Philip R. Chauvet, Tucson, AZ (US); Joseph V. Malinowski, Bridgeview, IL (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/622,427

(22) Filed: Feb. 13, 2015

(65) Prior Publication Data
US 2016/0239340 A1    Aug. 18, 2016

(51) Int. Cl.
*G06F 9/46* (2006.01)
*G06F 9/48* (2006.01)

(52) U.S. Cl.
CPC ............ *G06F 9/4881* (2013.01); *G06F 9/485* (2013.01)

(58) Field of Classification Search
CPC ................................. G06F 9/4881; G06F 9/485
USPC ........................................................... 718/106
See application file for complete search history.

(56) References Cited

U.S. PATENT DOCUMENTS

| | | | | |
|---|---|---|---|---|
| 5,745,758 A * | 4/1998 | Shaw | ...................... | G06F 9/465 718/102 |
| 5,794,047 A * | 8/1998 | Meier | ...................... | G06F 9/547 718/108 |
| 6,052,707 A * | 4/2000 | D'Souza | ............... | G06F 9/4881 718/106 |
| 6,199,095 B1 * | 3/2001 | Robinson | ............ | G06F 9/45504 718/107 |
| 7,036,124 B1 * | 4/2006 | Patterson | .................. | G06F 9/50 718/100 |

(Continued)

OTHER PUBLICATIONS

Calder et al. "Reducing Indirect Function Call Overhead in C++ Programs", 1994, ACM.*

(Continued)

*Primary Examiner* — Anna Deng
*Assistant Examiner* — Junchun Wu
(74) *Attorney, Agent, or Firm* — David W. Victor; Konrad Raynes Davda & Victor LLP

(57) ABSTRACT

Provided are a computer program product, system, and method for determining an ordering to use to open and close programs that call other programs. A dependency file indicates for each calling program at least one called program called by the calling program, wherein a called program that calls another program also comprises a calling program. The dependency file is processed to determine an order in which the called programs are called by the calling programs. A determination is made from the order the called programs called by an invoked calling program. The determined called programs are invoked according to the order. The calling program is invoked in response to invoking the determined called programs. The order indicates the order in which the calling programs and the called programs are invoked so the called programs are invoked before invoking the calling programs that invoke the called programs.

19 Claims, 8 Drawing Sheets

(56) References Cited

U.S. PATENT DOCUMENTS

| | | | |
|---|---|---|---|
| 7,082,604 B2* | 7/2006 | Schneiderman | G06F 9/4862 718/100 |
| 7,159,211 B2* | 1/2007 | Jalan | G06F 8/458 718/106 |
| 7,451,432 B2* | 11/2008 | Shukla | G06F 8/36 718/104 |
| 8,239,709 B2 | 8/2012 | Hom et al. | |
| 2003/0154233 A1* | 8/2003 | Patterson | G06F 9/50 718/104 |
| 2007/0101327 A1* | 5/2007 | Burdick | G06F 9/524 718/100 |
| 2007/0294696 A1* | 12/2007 | Papakipos | G06F 9/5027 718/102 |
| 2008/0098403 A1* | 4/2008 | Balakrishnan | G06F 9/4843 718/105 |
| 2009/0187913 A1* | 7/2009 | Wilkinson | G06F 9/466 718/103 |
| 2009/0293057 A1* | 11/2009 | Larkin | G06F 9/468 718/104 |
| 2010/0257517 A1 | 10/2010 | Sriram et al. | |
| 2010/0281488 A1* | 11/2010 | Krishnamurthy | G06F 11/3495 718/106 |
| 2011/0004885 A1* | 1/2011 | Kikuchi | H04L 41/147 718/104 |
| 2011/0202922 A1 | 8/2011 | Reynolds et al. | |
| 2012/0096463 A1* | 4/2012 | Agarwal | G06Q 10/0633 718/100 |

OTHER PUBLICATIONS

Findler et al. "Contracts for Higher-Order Functions", 2002, ACM.*
Honda et al. "An Observationally Complete Program Logic for Imperative Higher-Order Functions", 2005, IEEE.*

* cited by examiner

Dependency File Program Information

Startup Order Entry

DETERMINING AN ORDERING TO USE TO OPEN AND CLOSE PROGRAMS THAT CALL OTHER PROGRAMS

BACKGROUND OF THE INVENTION

1. Field of the Invention

The present invention relates to a computer program product, system, and method for determining an ordering to use to open and close programs that call other programs.

2. Description of the Related Art

In current systems, a system file may indicate an order in which operating system components are loaded, such as the drivers, network components, network protocols, etc. After these operating system components are loaded, application programs may then run and use the installed operating system components. Other programs an application calls that are not part of the operating system components, may also have to be opened and made available to the application.

There is a need in the art for improved techniques for managing the order in which programs are started and closed.

SUMMARY

Provided are a computer program product, system, and method for determining an ordering to use to open and close programs that call other programs. A dependency file indicates for each calling program at least one called program called by the calling program, wherein a called program that calls another program also comprises a calling program. The dependency file is processed to determine an order in which the called programs are called by the calling programs. A call is received to invoke one of the calling programs and a determination is made from the order the called programs called by the calling program in response to receiving the call. The determined called programs are invoked according to the order. The calling program is invoked in response to invoking the determined called programs, wherein the order indicates the order in which the calling programs and the called programs are invoked. The order indicates to invoke the called programs before invoking the calling programs that invoke the called programs.

DETAILED DESCRIPTION

Described embodiments provide techniques for determining an order in which to start and close programs when an invoked program may result in the call to numerous dependent or called programs, called from the invoked program and from other called programs called as a result of calling the invoked program. First a dependency file may be maintained and updated indicating called programs called by the calling programs. Then an order or startup order file may be generated from the information in the dependency file indicating an order in which programs are started. The determined order may assign order numbers such that a called program has a higher priority, i.e., is called first, before the calling program that will call the called. Further, with described embodiments, the order in which to close programs may be the reverse of the order in which the programs are started, so that calling programs that call another program are closed before the called programs are called.

Figure 1:
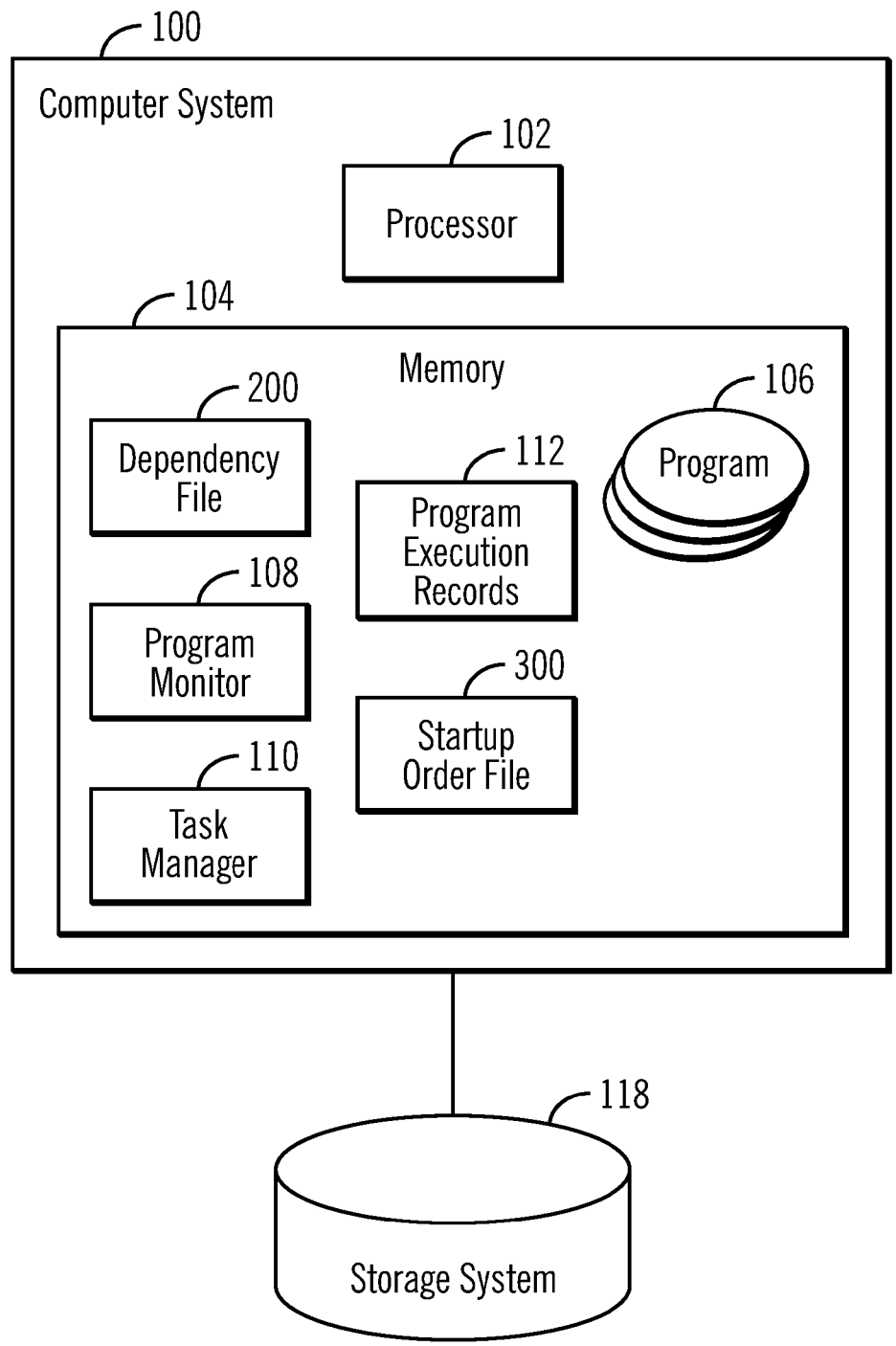
FIG. 1 illustrates an embodiment of a computing environment.

FIG. 1 illustrates an embodiment of a computing environment having a computer system 100 including a processor 102 that executes programs loaded in a memory 104, including a plurality of programs 106, such as operating system programs, drivers, storage device managers, third party application programs, etc.; a program monitor 108 that monitors the execution of the programs 106; and a task manager 110 that manages how the programs 106 are started, e.g., opened and closed. Programs 106 may be read from files in a storage system 118 and loaded into the memory 104 for execution by the processor 102. The called programs 106 may comprise operating system components, device drivers, third party applications, tasks, etc.

The memory 104, which may comprise a volatile or non-volatile memory device, further includes program execution records 112 that provide information on program 106 execution and calls, a dependency file 200 providing information on program dependency, such as calling programs and the programs they call, and a startup order file 300 indicating an order in which the programs 106 are started, which is based on the dependency file 200.

In International Business Machines ("IBM®") Z/OS® operating system embodiments, the task manager 110 that starts and closes programs may comprise the z/OS workload manager and other components that manage the starting and closing of tasks and programs 106. In Z/OS embodiments, the program execution records 112 may comprise System Management Facility (SMF) records. (IBM and Z/OS are trademarks of IBM in the United States and foreign countries).

The processor 102 may comprise one or more central processing units (CPUs) or virtual processors. The memory 104 may comprise one or more volatile or non-volatile memory devices used to storage loaded programs, such as a Random Access Memory (RAM), EEPROM (Electrically Erasable Programmable Read-Only Memory), flash memory, etc. The storage system 118 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc.

Figure 2:
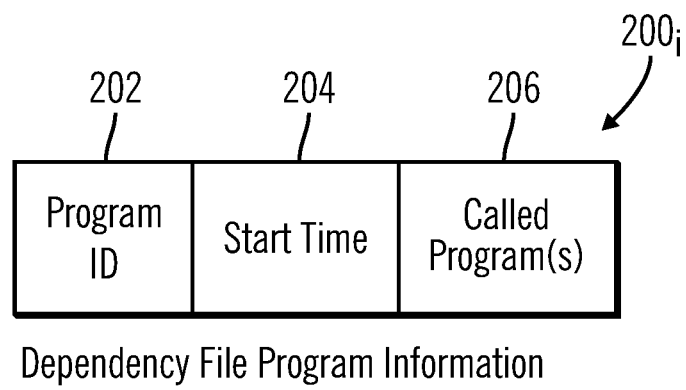
FIG. 2 illustrates an embodiment of dependency file program information.

FIG. 2 illustrates an embodiment of an instance of dependency file program information $200_i$ including a program identifier (ID) 202, a start time 204 at which the program 202 was started, and called programs 206 comprising programs called by the program 202. In this way, the calling program 202 is dependent on the execution of the called programs 206, which means the calling program 202 will invoke services and functions of the called programs 206 during the calling program's 202 execution. If the program 202 does not depend on the execution of any other programs, e.g., dependent programs, then the called programs 206 information would be empty.

In certain embodiments, the dependency file 200 is pre-populated with information on the operating system, such as operating systems components loaded during initialization. Further, in certain embodiments, the dependency file 200 may be updated with information on programs 106 whose execution and calls are monitored by the program monitor 108 which comprise applications not part of the operating system components, such as third party applications.

Figure 3:
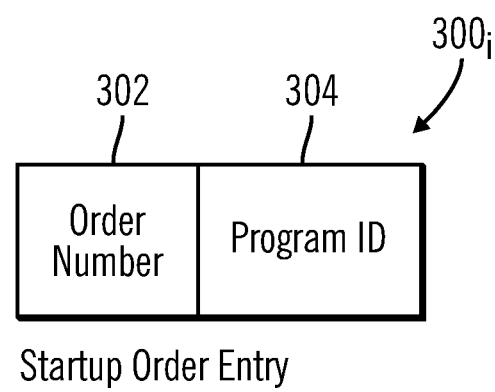
FIG. 3 illustrates an embodiment of startup order entries for programs indicating an order in which the programs are started.

FIG. 3 illustrates an embodiment of an instance of an entry 300, in the startup order file 300, which indicates an order number 302 for a program ID 304 for each program 106 started in the computer system 100. In one embodiment, the order number 302 may be explicitly indicated for a program 304. In alternative embodiments, the order number 302 may be inferred from an order of a listing of the programs 304 in the startup order file 300.

In one embodiment, the startup order file 300 indicates only an order in which programs are started, and the shutdown order can be inferred as the reverse of this startup order. In an alternative embodiment, the order file 300 may explicitly indicate the shutdown order alone or in combination with the application startup order.

Figure 4:
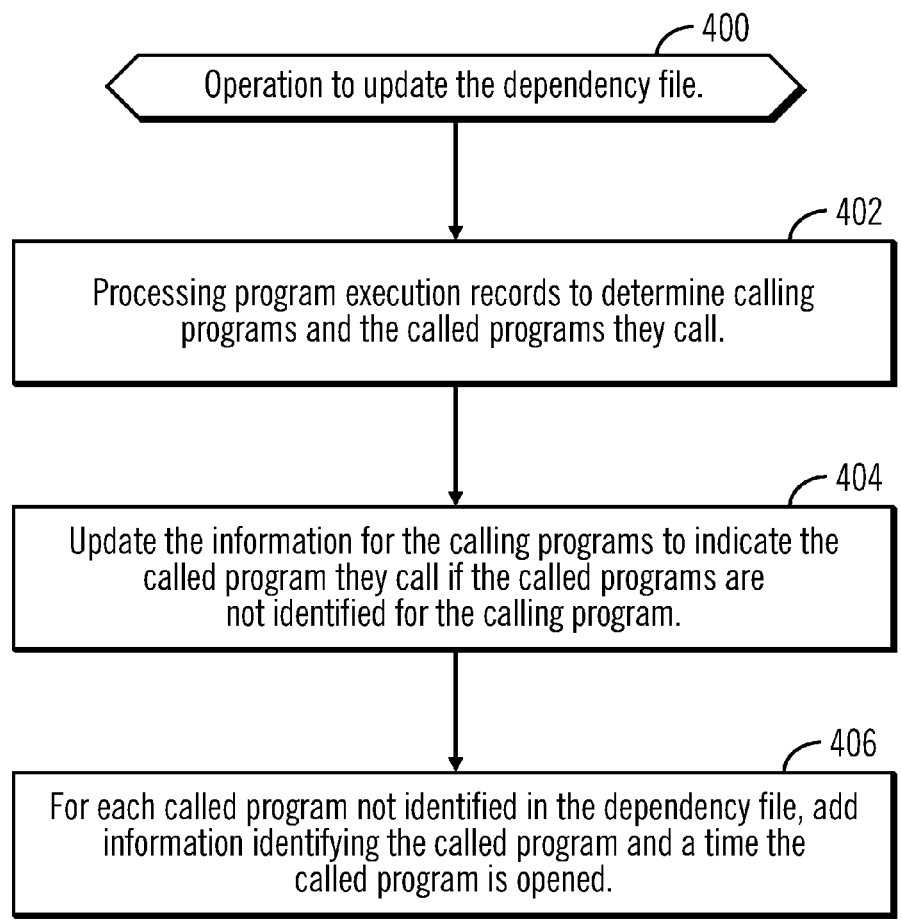
FIG. 4 illustrates an embodiment of operations to update a dependency file.

FIG. 4 illustrates an embodiment of operations performed by the program monitor 108, or some other program 106, 110, to update the dependency file 200 based on program execution information. The operations of FIG. 4 may be performed periodically or in response to an event, such as a program execution. Upon initiating the update operation (at block 400), the program monitor 108 processes (at block 402) the program execution records 112 to determine calling programs 106 and the called programs 106 they call. The information $200_i$ for a calling program is updated (at block 404) to indicate the called programs 106 they call if the called programs are not already indicated in the called program 206 information. If there is no information for a calling program, then the information $200_i$ would be added to the dependency file 200. Information on when the called program is called or started may also be included. For each called program not identified in the dependency file 200, information $200_i$ is added (at block 406) for the called program and a start time 200 when the called program is opened.

Figure 5:
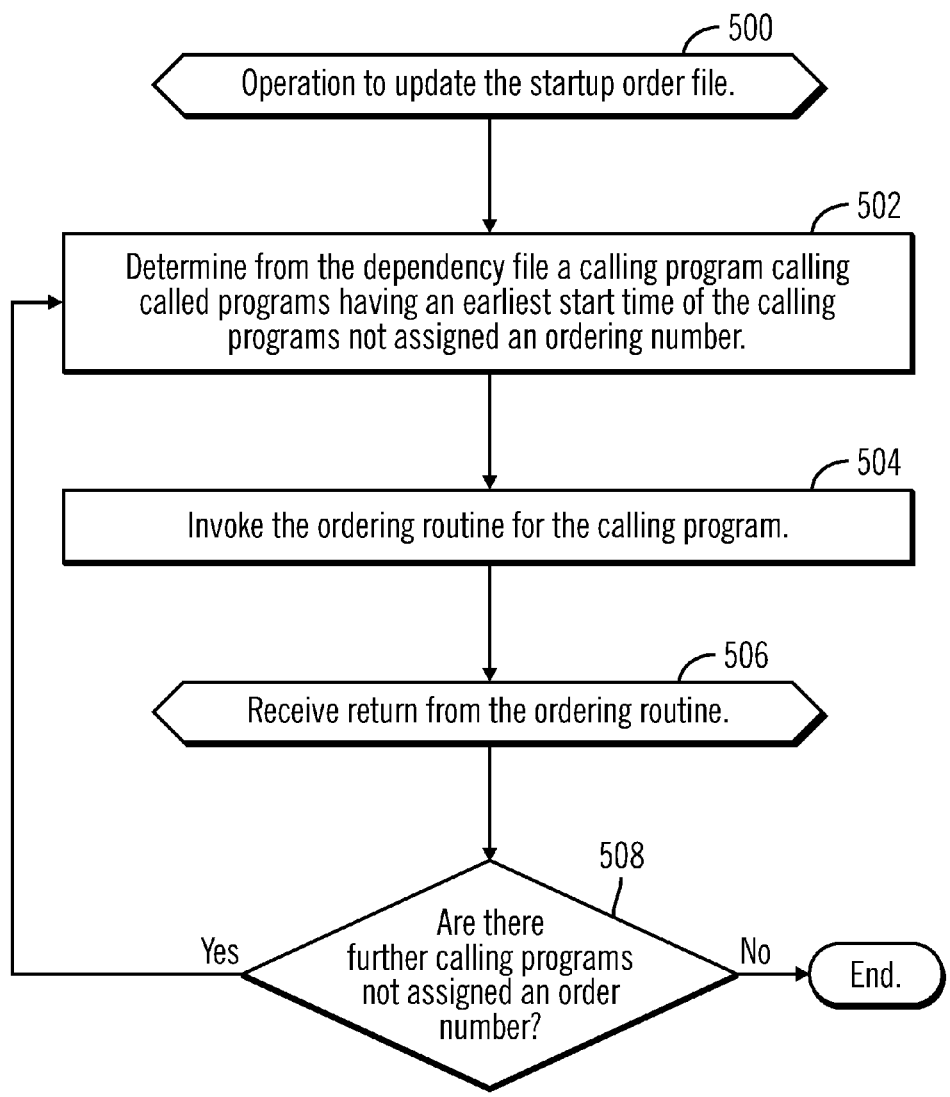
FIG. 5 illustrates an embodiment of operations to update a start order file

FIG. 5 illustrates an embodiment of operations performed by the program monitor 108, or some other program 106, 110, to update the startup order file 300 based on the dependency file 200. Upon initiating the update operation (at block 500), the program monitor 108 determines (at block 502) from the dependency file 200 a calling program calling called programs having an earliest start time of the calling programs not assigned an ordering number, i.e., not considered. An ordering routine (FIG. 6) is then called (at block 504) for each determined called program to recursively assign order numbers to the called programs, and any second or further level called programs they call, where the called programs are assigned an earlier order number to the calling program according to the recursive logic of the ordering routine of FIG. 6. After the ordering routine (FIG. 6) returns (at block 506) after assigning order numbers 302 to each called programs and any programs they further call, if (at block 508) there are further calling programs not already assigned an order number 302 in the startup order file 300, then control returns to block 502 to assign order numbers to that calling program. Otherwise, if (at block 508) there are no calling programs indicated in the dependency file 200 not assigned an order number 302, then control ends.

Figure 6:
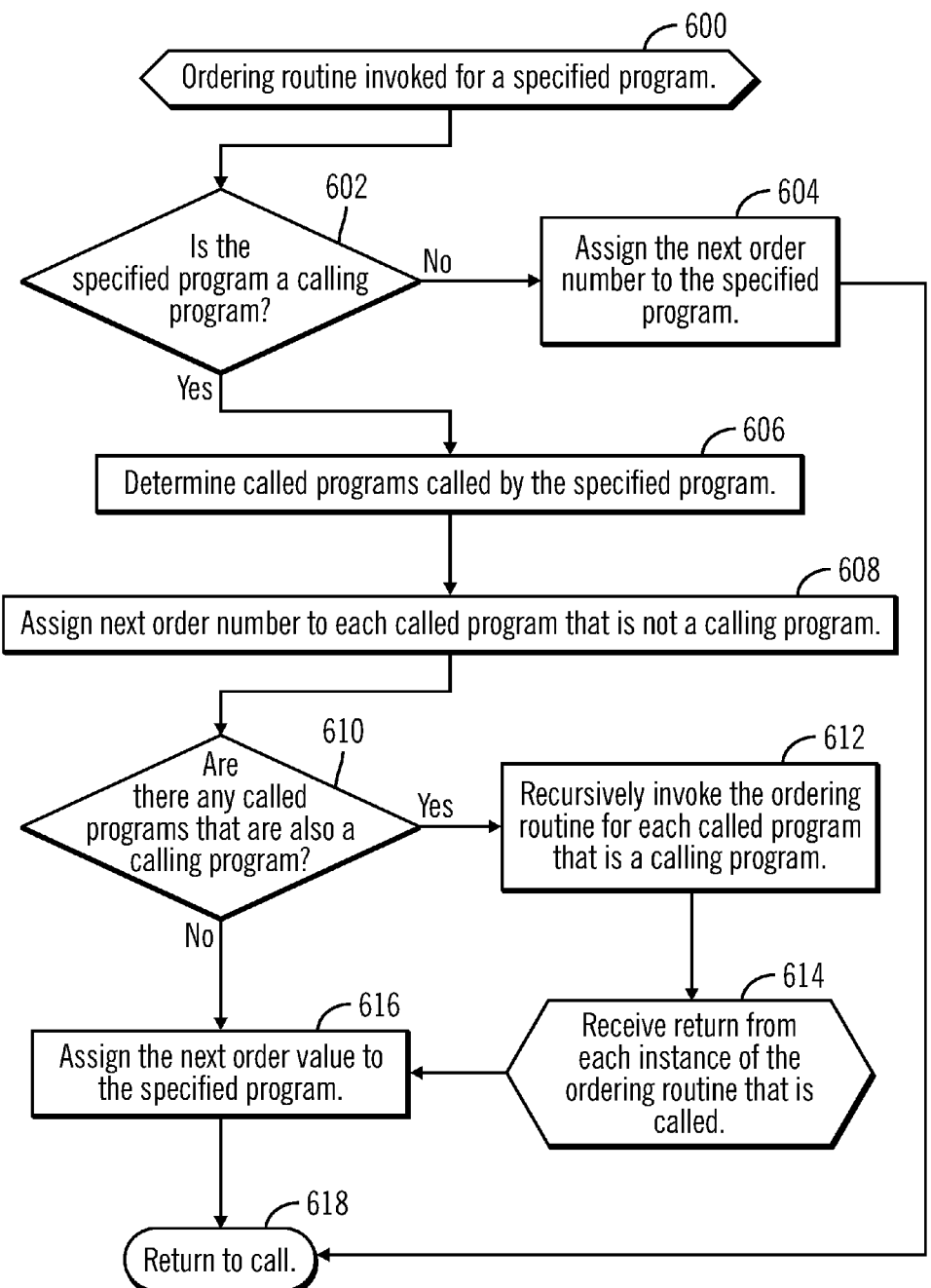
FIG. 6 illustrates an embodiment of operations of an ordering routine.

FIG. 6 illustrates an embodiment of operations performed by the program monitor 108 or some other program 106, 110, when executing the ordering routine invoked for a specified program to recursively assign order numbers in the startup order file 300. Upon invoking (at block 600) the ordering routine for a specified program 106, if (at block 602) the specified program 106 is not a calling program, then the next order number is assigned (at block 604) to the specified program and control returns (at block 618) to the point where the call was made. If (at block 602) the specified program 106 is a calling program, then the program monitor 108 determines (at block 606) called programs 106 called by the specified program 106 and assigns (at block 608) a next order number to each called program that is not a calling program.

If (at block 610) there are any called programs that are also a calling program, then the ordering routine of FIG. 6 is recursively invoked (at block 612) for each called program to recursively assign order numbers 302 to each called program and any called programs they call. Upon receiving return (at block 614) for each instance of the ordering routine that was called (at block 612) or if (at block 610) there are no called programs that are also a calling program, then control proceeds to block 616 to assign the next order number to the specified program for which the current executing instance of the ordering routine was called. Control then returns to the invocation of the ordering routine, which may be from the recursive call to the ordering routine (at block 614) or from the initial update routine (at block 506 in FIG. 5).

With the embodiments of FIGS. 4, 5 and 6, programs are assigned an order number, expressly or inherently according to a listed order, by assigning called programs an order number earlier in the order than the calling program that called them.

Figure 7:
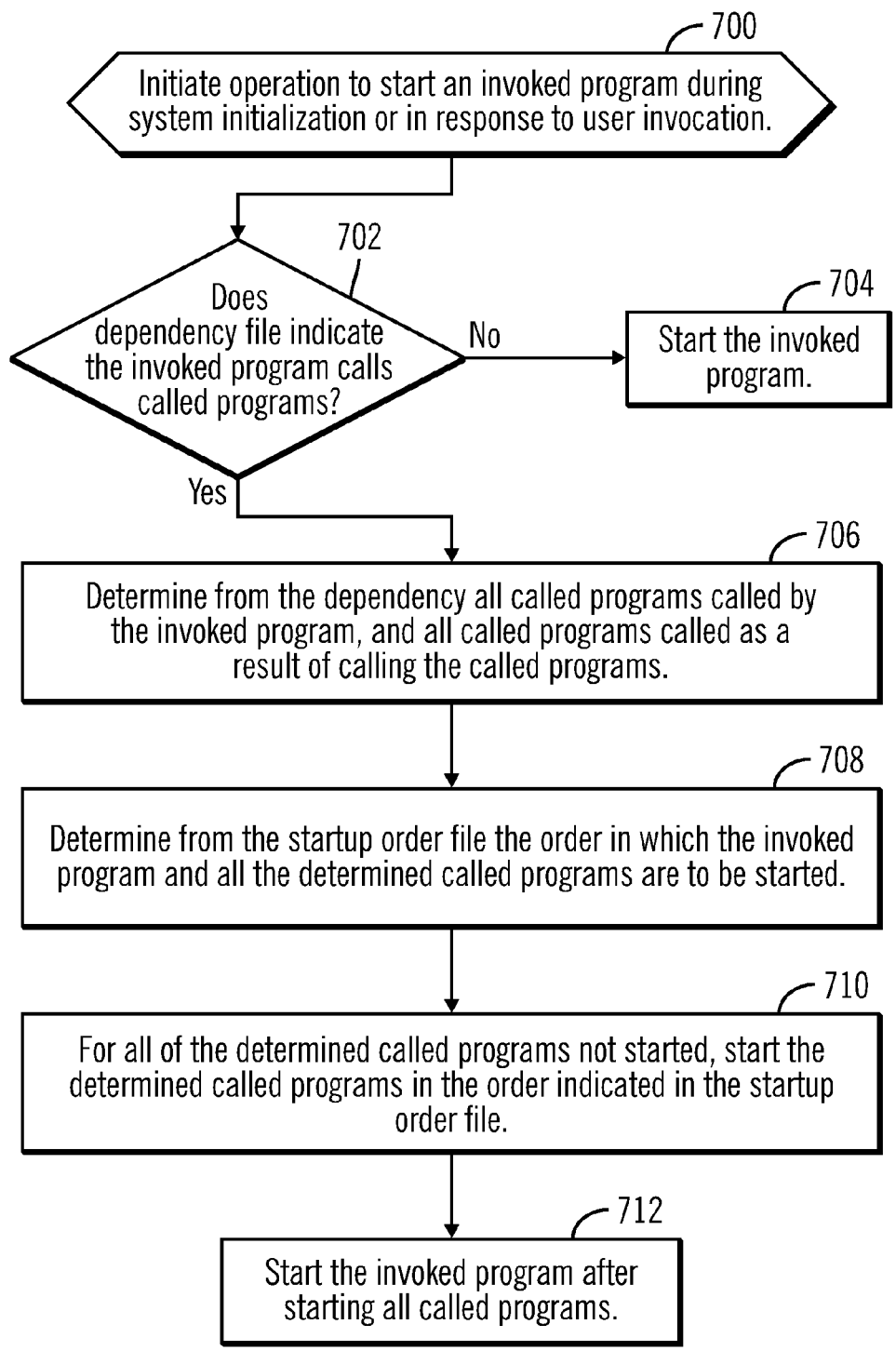
FIG. 7 illustrates an embodiment of operations to start an invoked program.

FIG. 7 illustrates an embodiment of operations performed by the task manager 110 to start an invoked program, invoked during computer system 100 startup initialization or in response to user invocation of the invoked program. Upon initiating the startup operation (at block 700), the task manager 110 determines (at block 702) whether the dependency file 200, information for the invoked program indicates that the invoked program, identified in field 202, calls called programs 206. If there are no called programs, then the invoked program is started (at block 704). Otherwise, if (at block 702) there are called programs 206, then the task manager 110 determines (at block 706) from the dependency file 200 all called programs 206 called by the invoked program 202, and all called programs called as a result of calling the determined called programs 206. In this wall all called programs 206 called by the invoked program 202 and any other programs called by the called programs 206 and further called programs in the sequence of calls resulting from the call to the invoked program 202 are determined.

The ordering ensures that any called program has a higher order than the order assigned to the calling program calling the called program in the sequence of calls initiated by the invoked program.

The task manager 110 determines (at block 708) from the startup order file 300 the order in which the invoked program and all the determined called programs are to be started/opened. All called programs not started are started (at block 710) in the order indicated in the startup order file 300, e.g., according to the order numbers 302, or as determined by the order in which the programs are listed. The invoked program is then started (at block 712) after starting all the called programs. In this way, the invoked programs is not started until all called programs 712 that the invoked program may access or call are started.

Figure 8:
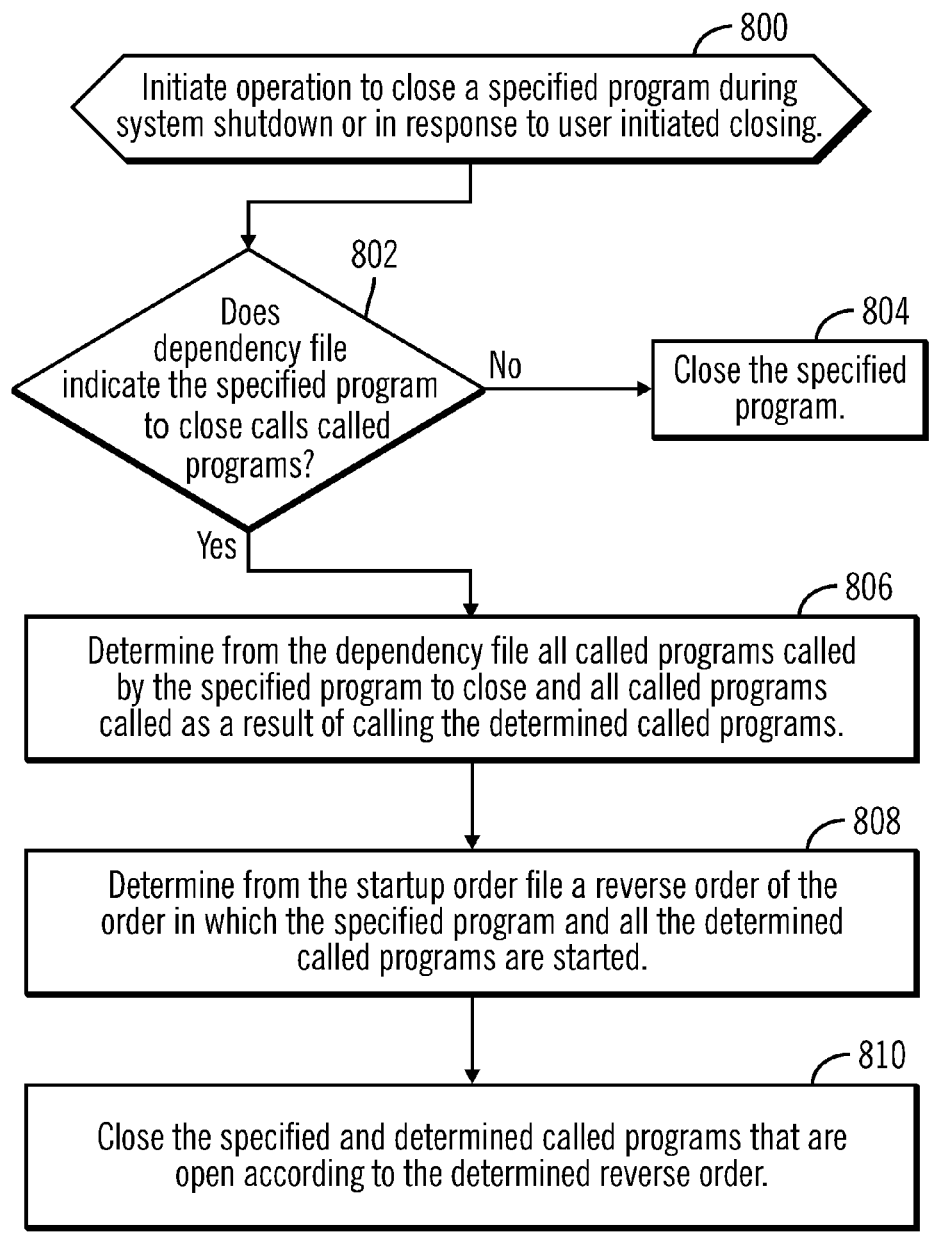
FIG. 8 illustrates an embodiment of operations to close a specified program.

FIG. 8 illustrates an embodiment of operations performed by the task manager 110 to close a specified program 106, closed during a computer system 100 shutdown routine or in response to a user initiating closing of the program. Upon initiating the shutdown operation (at block 800), the task manager 110 determines (at block 802) whether the dependency file 200, information for the specified program 106, identified in field 202, indicates that the specified program 202 calls called programs 206. If (at block 802) there are no called programs, then the specified program 106 is closed (at block 804). Otherwise, if (at block 802) there are called programs 206, then the task manager 110 determines (at block 806) from the dependency file 200 all called programs called by the specified program, and all called programs called as a result of calling the determined called programs.

The task manager 110 determines (at block 808) from the startup order file 300 a reverse order of the order in which the specified program and all the determined called programs are started. The specified and determined called programs that are open are closed (at block 810) according to the determined reverse order. In this way, the specified program is first closed, than all the called programs called as a result of invoking the specified program are then closed.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
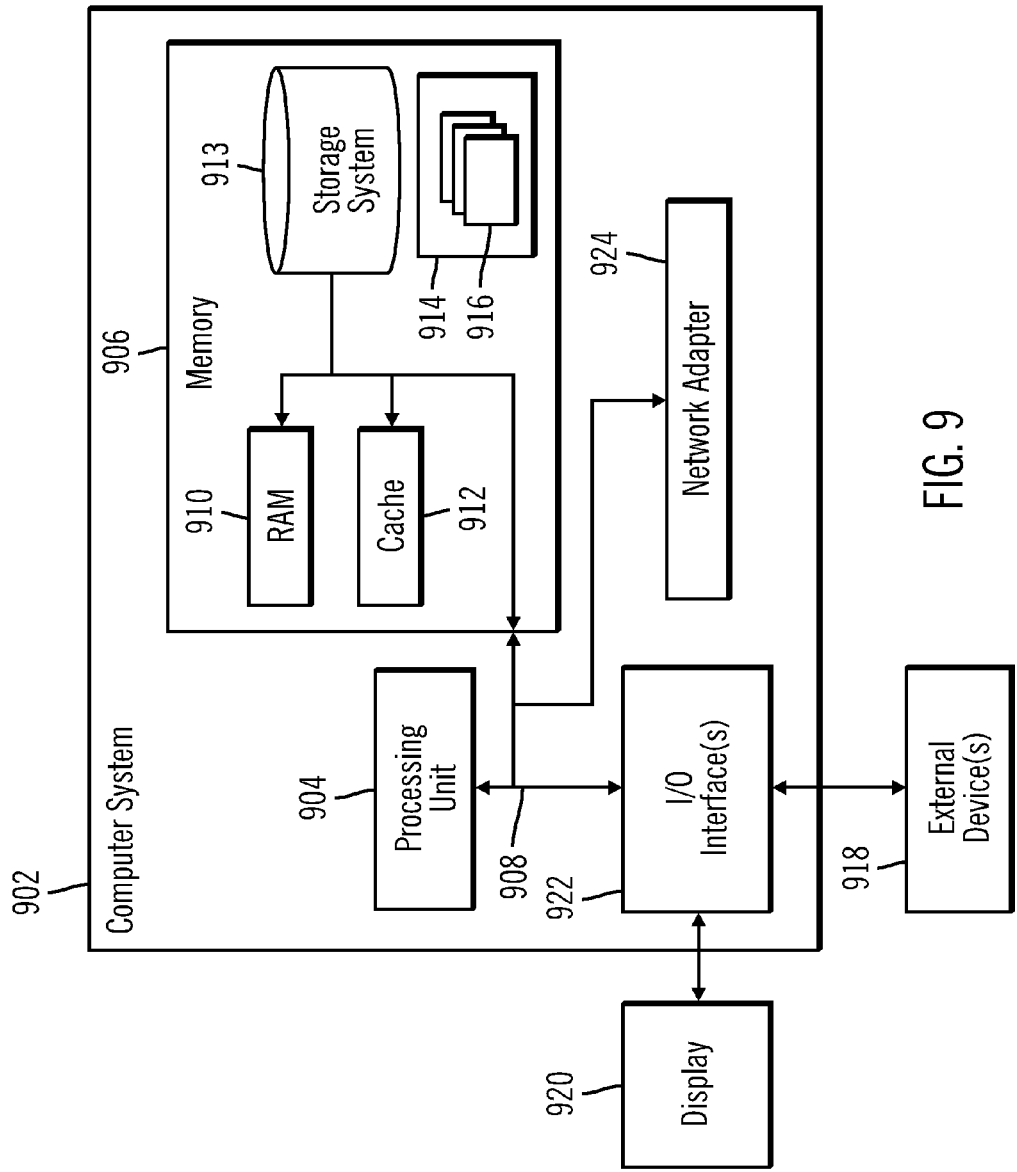
FIG. 9 illustrates an embodiment of a computing environment in which the components of FIG. 1 may be implemented.

The computational components of FIG. 1, including the computer system 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining an execution order of programs in a computer system, wherein the computer program product comprises a computer readable storage medium having program instructions embodied therewith, the program instructions executable by a processor to cause operations, the operations comprising:
providing a dependency file indicating for each of a plurality of calling programs at least one called program called by a calling program, wherein a called program that calls another program also comprises a calling program;
processing the dependency file to determine an order in which the called programs are called by the calling programs, wherein the called programs have an earlier position in the order than the calling programs that call the called programs;
receiving a call to invoke one of the calling programs;
determining, from the order, the called programs called by the calling program in response to receiving the call;
invoking the determined called programs according to the order; and
invoking the calling program invoked in the call in response to invoking the determined called programs, wherein the order indicates the order in which the calling programs and the called programs are invoked, and wherein the order indicates to invoke the called programs before invoking the calling programs that invoke the called programs.

2. The computer program product of claim 1, wherein the calling programs are invoked as part of an initialization routine or in response to user selection to invoke.

3. The computer program product of claim 1, wherein the operations further comprise:
monitoring the calling programs;
generating an updated dependency file indicating the called programs, a time they are called, and the calling programs making the calls; and
using the updated dependency file to update the order to indicate the called programs, wherein the called programs have a higher order in the order than the calling programs that call the called programs.

4. The computer program product of claim 3, wherein the dependency file is prepopulated with information on operating system components, and wherein the monitored calling programs comprise applications not part of the operating system components.

5. The computer program product of claim 1, wherein the operations further comprise:
determining whether each of the determined called programs are already running, wherein each of the determined called programs are invoked that are determined to be not running.

6. The computer program product of claim 1, wherein the operations further comprise:
determining called programs called by the invoked calling program, and called programs called as a result of calling the determined called programs;
determining, from the order, a startup order in which the invoked calling program, the determined called programs, and the called programs called as result of calling the determined called programs are started; and
starting the invoked calling program, the determined called programs, and the called programs called as a result of calling the determined called programs according to the determined startup order.

7. The computer program product of claim 1, wherein the operations further comprise:
updating a system file that controls a startup and shutdown of the calling and called programs, wherein the system file indicates the order in which the called and calling programs are invoked.

8. The computer program product of claim 1, wherein the operations further comprise:
initiating a shutdown procedure to close at least one of the calling programs;
for each of the calling programs to close, performing:
determining called programs called by the calling program to close and called programs called as a result of calling the determined called programs;
determining, from the order, a shutdown order in which the calling program to close, the determined called programs, and the called programs called as result of calling the determined called programs are started; and closing the called program to close, the determined called programs, and the called programs called as a result of calling the determined called programs according to the determined shutdown order.

9. The computer program product of claim 8, wherein the shutdown order is a reverse order to the order in which the calling program to close, the determined called programs and the called programs called as a result of calling the determined called programs are started.

10. A system for determining an execution order of programs, comprising:
a processor; and
a computer readable storage medium having program instructions embodied therein that when executed perform operations, the operations comprising:
providing a dependency file indicating for each of a plurality of calling programs at least one called program called by a calling program, wherein a called program that calls another program also comprises a calling program;
processing the dependency file to determine an order in which the called programs are called by the calling programs, wherein the called programs have an earlier position in the order than the calling programs that call the called programs;
receiving a call to invoke one of the calling programs;
determining, from the order, the called programs called by the calling program in response to receiving the call;
invoking the determined called programs according to the order; and invoking the calling program in response to invoking the determined called programs, wherein the order indicates the order in which the calling programs and the called programs are invoked, and wherein the order indicates to invoke the called programs before invoking the calling programs that invoke the called programs.

11. The system of claim 10, wherein the operations further comprise:
monitoring the calling programs;
generating an updated dependency file indicating the called programs, a time they are called, and the calling programs making the calls; and
using the updated dependency file to update the order to indicate the called programs, wherein the called programs have a higher order in the order than the calling programs that call the called programs.

12. The system of claim 10, wherein the operations further comprise:
determining called programs called by the invoked calling program, and called programs called as a result of calling the determined called programs;
determining, from the order, a startup order in which the invoked calling program, the determined called programs, and the called programs called as result of calling the determined called programs are started; and
starting the invoked calling program, the determined called programs, and the called programs called as a result of calling the determined called programs according to the determined startup order.

13. The system of claim 10, wherein the operations further comprise:
initiating a shutdown procedure to close at least one of the calling programs;
for each of the calling programs to close, performing:
determining called programs called by the calling program to close and called programs called as a result of calling the determined called programs;
determining, from the order, a shutdown order in which the calling program to close, the determined called programs, and the called programs called as result of calling the determined called programs are started; and
closing the called program to close, the determined called programs, and the called programs called as a result of calling the determined called programs according to the determined shutdown order.

14. The system of claim 13, wherein the shutdown order is a reverse order to the order in which the calling program to close, the determined called programs and the called programs called as a result of calling the determined called programs are started.

15. A method for determining an execution order of programs in a computer system, comprising:
providing a dependency file indicating for each of a plurality of calling programs at least one called program called by a calling program, wherein a called program that calls another program also comprises a calling program;
processing the dependency file to determine an order in which the called programs are called by the calling programs, wherein the called programs have an earlier position in the order than the calling programs that call the called programs;
receiving a call to invoke one of the calling programs;
determining, from the order, the called programs called by the calling program in response to receiving the call;
invoking the determined called programs according to the order; and
invoking the calling program in response to invoking the determined called programs, wherein the order indicates the order in which the calling programs and the called programs are invoked, and wherein the order indicates to invoke the called programs before invoking the calling programs that invoke the called programs.

16. The method of claim 15, further comprising:
monitoring the calling programs;
generating an updated dependency file indicating the called programs, a time they are called, and the calling programs making the calls; and
using the updated dependency file to update the order to indicate the called programs, wherein called programs have a higher order in the order than the calling programs that call the called programs.

17. The method of claim 15, further comprising:
determining called programs called by the invoked calling program, and called programs called as a result of calling the determined called programs;
determining, from the order, a startup order in which the invoked calling program, the determined called programs, and the called programs called as result of calling the determined called programs are started; and
starting the invoked calling program, the determined called programs, and the called programs called as a result of calling the determined called programs according to the determined startup order.

18. The method of claim 15, further comprising:
initiating a shutdown procedure to close at least one of the calling programs;
for each of the calling programs to close, performing:
- determining called programs called by the calling program to close and called programs called as a result of calling the determined called programs;
- determining, from the order, a shutdown order in which the calling program to close, the determined called programs, and the called programs called as result of calling the determined called programs are started; and
- closing the called program to close, the determined called programs, and the called programs called as a result of calling the determined called programs according to the determined shutdown order.

19. The method of claim 18, wherein the shutdown order is a reverse order to the order in which the calling program to close, the determined called programs and the called programs called as a result of calling the determined called programs are started.

* * * * *